(12) United States Patent
Wankmueller et al.

(10) Patent No.: US 8,255,688 B2
(45) Date of Patent: Aug. 28, 2012

(54) SYSTEMS AND METHODS FOR MUTUAL AUTHENTICATION USING ONE TIME CODES

(75) Inventors: John Wankmueller, Great Neck, NY (US); Dave Anthony Roberts, Appleton Warrington (GB); Paul Michael Evans, Farnborough (GB)

(73) Assignee: MasterCard International Incorporated, Purchase, NY (US)

( * ) Notice: Subject to any disclaimer, the term of this patent is extended or adjusted under 35 U.S.C. 154(b) by 1238 days.

(21) Appl. No.: 12/018,293

(22) Filed: Jan. 23, 2008

(65) Prior Publication Data
US 2009/0185687 A1 Jul. 23, 2009

(51) Int. Cl.
*H04L 9/32* (2006.01)
(52) U.S. Cl. .............................. 713/168; 713/169
(58) Field of Classification Search .................. None
See application file for complete search history.

(56) References Cited

U.S. PATENT DOCUMENTS

| | | | | |
|---|---|---|---|---|
| 6,609,114 B1* | 8/2003 | Gressel et al. | .................. | 705/50 |
| 7,103,575 B1* | 9/2006 | Linehan | .......................... | 705/64 |
| 7,374,082 B2* | 5/2008 | Van de Velde et al. | ....... | 235/380 |
| 7,502,933 B2* | 3/2009 | Jakobsson et al. | ............ | 713/172 |
| 2003/0236748 A1* | 12/2003 | Gressel et al. | .................. | 705/41 |
| 2004/0172535 A1* | 9/2004 | Jakobsson et al. | ............ | 713/168 |
| 2005/0033688 A1* | 2/2005 | Peart et al. | ...................... | 705/39 |
| 2005/0119978 A1* | 6/2005 | Ates | ................................ | 705/67 |
| 2007/0012763 A1* | 1/2007 | Van de Velde et al. | ....... | 235/380 |
| 2007/0118483 A1* | 5/2007 | Hill et al. | ........................ | 705/64 |

FOREIGN PATENT DOCUMENTS
WO  WO 2005/001618  1/2005

OTHER PUBLICATIONS

Bruce Schneier, "Protocols, Algorithms, and Source Code in C" Applied Cryptography, Second Edition, 1996.
Ch. Mitchell, "Text for ISO/IEC FDIS 9798-4, Information technology-Security techniques-Entity authentication-Part 4: Mechanisms using a cryptographic check function." (revision of ISO/IEC 9798-4:1995), ISO/IEC JTC 1/SC 27 N 2289, May 10, 1999.

* cited by examiner

*Primary Examiner* — William Powers
(74) *Attorney, Agent, or Firm* — Baker Botts LLP

(57) ABSTRACT

Methods and systems for mutual authentication and personalizing a transaction device, such as a payment, transaction, or identity card. Successively generated one time codes are calculated by a first and second entity. One of the codes is transmitted to the second entity, which verifies the code is proper, then encrypts a second one time code using a third one time code and transmits the encrypted data to the first entity. The first entity decrypts the data using the third one time code, verifies the encrypted second one time code is proper, thereby mutually authenticating, and establishing a shared encryption key for subsequent communications, including transmission of personalization data.

25 Claims, 5 Drawing Sheets

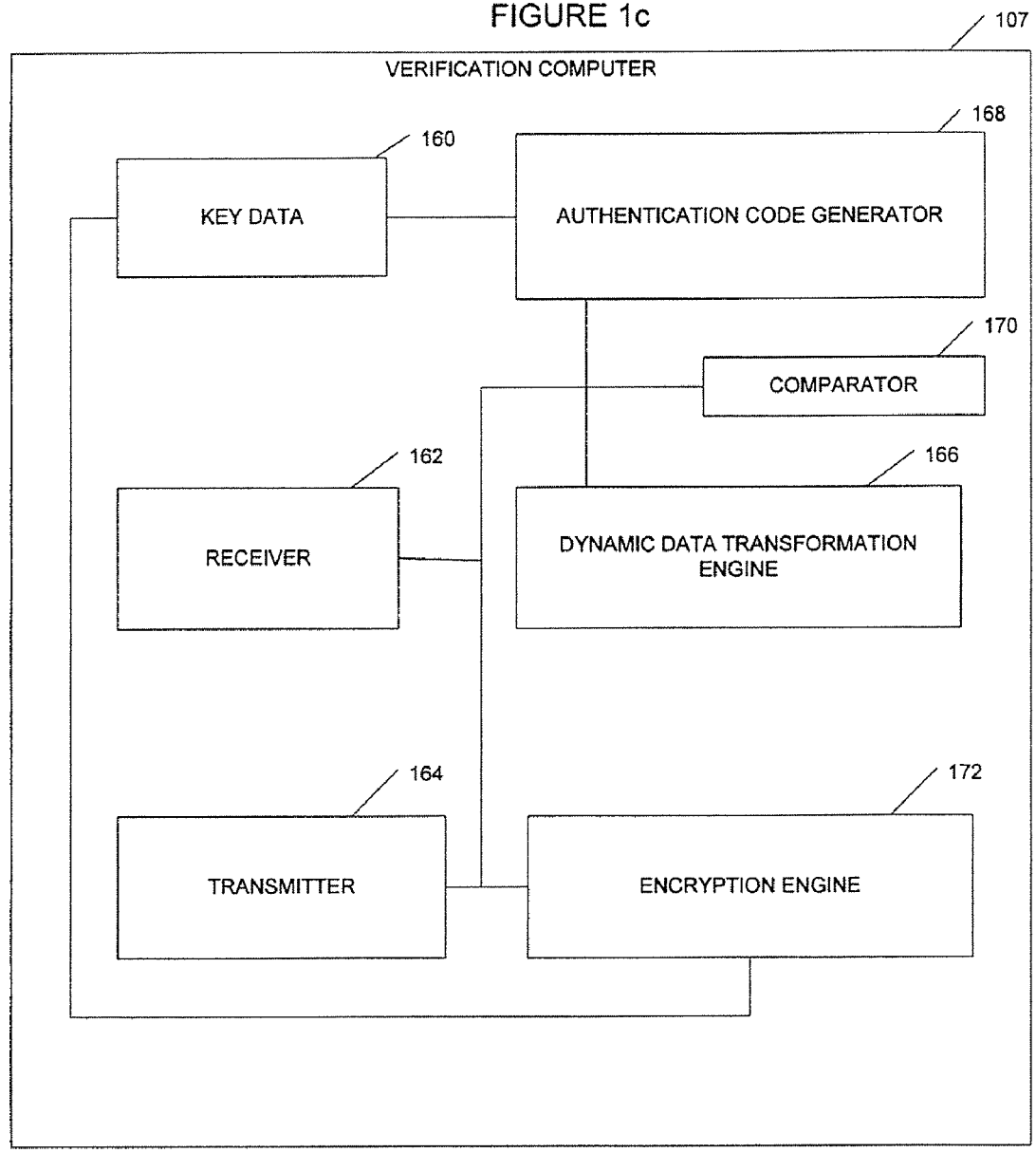

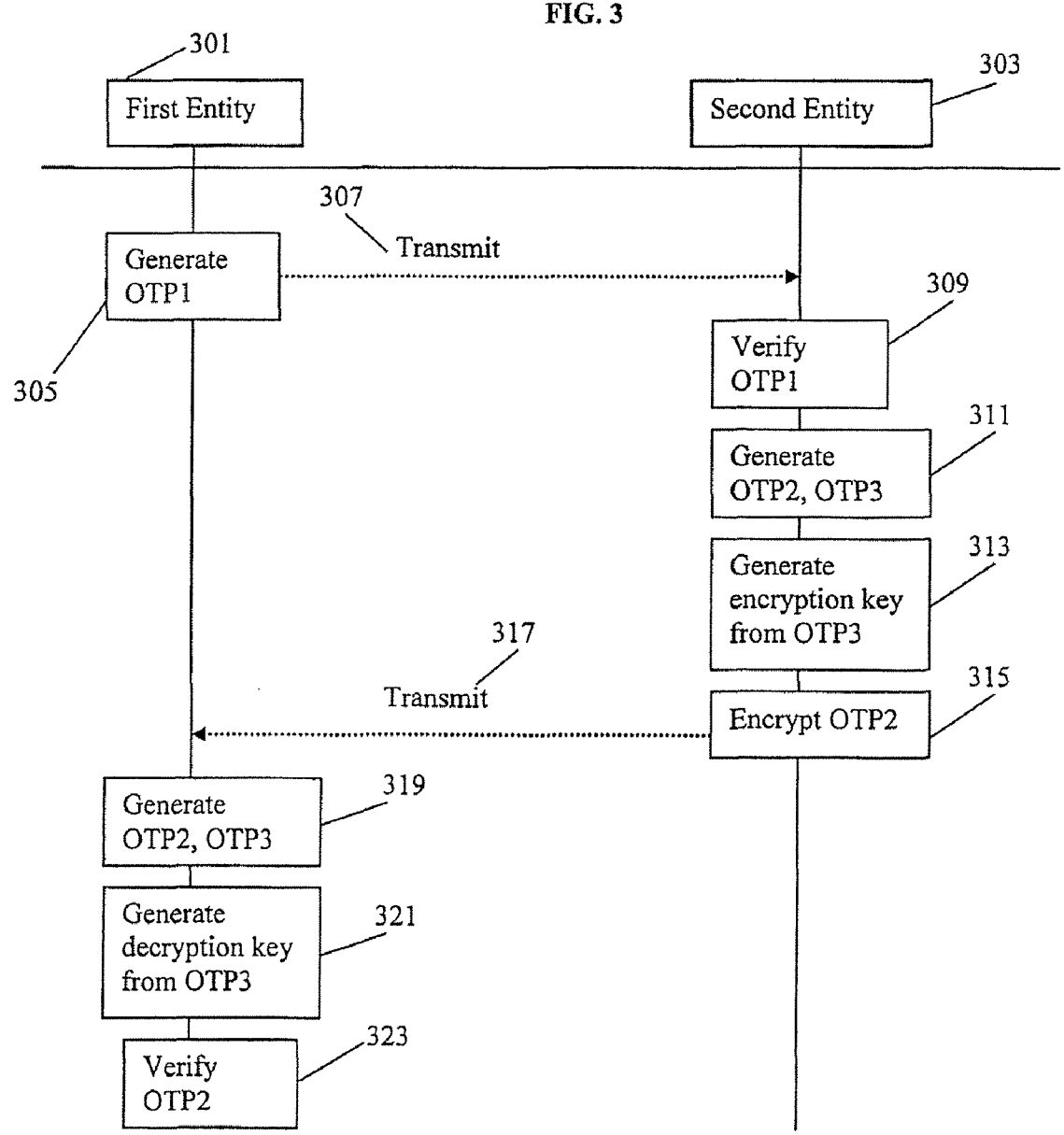

SYSTEMS AND METHODS FOR MUTUAL AUTHENTICATION USING ONE TIME CODES

BACKGROUND

Mutual authentication between two entities is known in the art. For example ISO/IEC technical standard 9798-4 (hereby incorporated by reference in its entirety) describes entity authentication using cryptographic check functions. A simplified mutual authentication technique that permits subsequent secure communications using a shared encryption key is desirable for numerous applications. One application of a simplified mutual authentication technique is in personalizing payment devices and other identification devices before they are used. Once personalization information, or identifying information, has been incorporated into the device, the device may be used to, for example, purchase goods, identify the object or an individual, or for other purposes.

The process of personalization traditionally occurs at a trusted centralized location with both physical and logical controls to ensure security. For example, credit cards may begin as generic card stock with embedded security features (such as holograms) and may later be associated with identifying information to support customer identification, purchases, marketing, advertising, and other applications by embossing or writing data to the card with customer identifying information at a personalization facility. This process ensures that unscrupulous individuals do not obtain credit card stock and incorporate spurious information onto the cards. Similar techniques may be used to associate cell-phone SIM cards with a particular customer or cell-phone.

There is a need for a personalization solution that allows transaction devices such as credit or debit cards, contactless payment devices (including non-card form factors), loyalty cards or devices, integrated circuit cards, and other identification devices to be personalized in a less secure environment, such as at a point-of-sale terminal, a self-service kiosk or vending machine, in a home user's PC, or over-the-air ("OTA") in portable devices such as cell-phones, smart phones, or personal digital assistants.

SUMMARY

Systems and methods for simplified mutual authentication and securely personalizing transaction devices are described herein. Some embodiments of the disclosed subject matter include procedures for securely personalizing a transaction device including obtaining first dynamic data; retrieving at least a portion of key data from a data storage; calculating a first authentication code based on said first dynamic data and said at least a portion of key data; transmitting at least a portion of said first dynamic data and said first authentication code to a verification computer; obtaining second dynamic data based on said first dynamic data; calculating a second authentication code based on said second dynamic data and said at least a portion of key data; receiving personalization data encrypted using at least said second authentication code; and decrypting said personalization data, personalizing said device based at least in part on said personalization data. Some embodiments of the disclosed subject matter include the procedures wherein said first dynamic data is a counter. Some embodiments of the disclosed subject matter include the procedures wherein said obtaining second dynamic data comprises incrementing said first dynamic data. Some embodiments of the disclosed subject matter include the procedures wherein said transaction device is a contactless payment device. Some embodiments of the disclosed subject matter include the procedures wherein said calculating a first authentication code includes generating a digital encryption key based on said at least a portion of key data; performing a digital cryptographic operation on input data consisting at least in part of said first dynamic data, using said encryption key; and extracting predetermined bits of the result of said cryptographic operation and designating those extracted bits as said first authentication code. Some embodiments of the disclosed subject matter include the procedures wherein said personalizing includes programming said transaction device with a secret key. Some embodiments of the disclosed subject matter include the procedures wherein said personalizing includes programming said transaction device with a payment account number.

Some embodiments of the disclosed subject matter include procedures for securely personalizing a transaction device including receiving, from a transaction terminal, an authentication message comprising at least a portion of a first dynamic data and a first authentication code associated with said transaction device; calculating a second dynamic data based on said first dynamic data; retrieving at least a portion of key data from a data storage; calculating a second authentication code based on said second dynamic data and said at least a portion of key data; encrypting personalization data associated with said transaction device using an encryption key based at least in part on said second authentication code; and transmitting said personalization data in encrypted form to said transaction terminal for personalization of said transaction device. Some embodiments of the disclosed subject matter include the procedures wherein said calculating a second authentication code includes generating a digital encryption key based on said at least a portion of key data; performing a digital cryptographic operation on input data consisting at least in part of said second dynamic data, using said encryption key; and extracting predetermined bits of the result of said cryptographic operation and designating those extracted bits as said second authentication code. Some embodiments of the disclosed subject matter include the procedures wherein said personalization data includes a secret key. Some embodiments of the disclosed subject matter include the procedures wherein said personalization data includes a payment account number.

Some embodiments of the disclosed subject matter include components for personalizing a transaction device including a dynamic data generator arranged to generate a first dynamic data and a second dynamic data, said second dynamic data mathematically related to said first dynamic data; a key data digital storage device; an authentication code generation engine electrically coupled to said dynamic data generator and said key data digital storage device, said authentication code generation engine arranged to calculate a first authentication code based on a first dynamic data obtained from said dynamic data generator and at least a portion of key data obtained from said key data digital storage device, said authentication code generation engine further arranged to calculate a second authentication code based at least in part on said second dynamic data; a transmitter coupled to said authentication code processor arranged to transmit at least a portion of said first dynamic data and said first authentication code; a receiver arranged to receive encrypted personalization data; a decryption engine coupled to said receiver arranged to decrypt said personalization data using a second authentication data; a personalization controller for personalizing said transaction device based at least in part on said decrypted personalization data. Some embodiments of the disclosed subject matter include the components wherein said transaction device is a contactless integrated circuit payment device. Some embodiments of the disclosed subject matter include the components wherein at least one of said authentication code generation engine, said decryption engine, and said personalization controller is implemented as a firmware module embedded within said transaction device. Some embodiments of the disclosed subject matter include the components wherein at least one of said authentication code generation engine, said decryption engine, and said personalization controller is implemented as a software module executed by a processor in said transaction device. Some embodiments of the disclosed subject matter include the components wherein said personalization data includes a secret key. Some embodiments of the disclosed subject matter include the components wherein said personalization data includes a payment account number.

Some embodiments of the disclosed subject matter include components for generating transaction device personalization data including a key data digital storage device; a receiver arranged to receive from a personalization terminal, an authentication message comprising at least a portion of a first dynamic data and a first authentication code associated with said transaction device; a dynamic data transformation engine electrically coupled to said receiver, arranged to transform said first dynamic data into second dynamic data; an authentication code generation engine electrically coupled to said key data digital storage device, said authentication code processor arranged to calculate a second authentication code based on a first dynamic data obtained from said dynamic data generator and at least a portion of key data obtained from said key data digital storage device; a comparator electrically coupled to said authentication code generation engine arranged to compare said first authentication code and said second authentication code, wherein said authentication code generation engine is further arranged to calculate a third authentication code based at least in part on said second dynamic data when said comparator determines that said first authentication code equals said second authentication code; a personalization data storage device; an encryption engine electrically coupled to said authentication code generation engine and said personalization data storage device, arranged to encrypt said personalization data using an encryption key based at least in part on said third authentication code; and a transmitter electrically coupled to said encryption engine arranged to transmit said personalization data in encrypted form to said transaction terminal for personalization of said transaction device. Some embodiments of the disclosed subject matter include the components wherein said transaction device is a contactless integrated circuit payment device. Some embodiments of the disclosed subject matter include the components wherein said components for generating transaction device personalization data includes a processor, and wherein said at least one of said a dynamic data transformation engine, said authentication code generation engine, said comparator, and said encryption engine is implemented as a software module executed by said processor. Some embodiments of the disclosed subject matter include the components wherein said personalization data includes a secret key. Some embodiments of the disclosed subject matter include the components wherein said personalization data includes a payment account number.

BRIEF DESCRIPTION OF THE DRAWINGS

For a more complete understanding of example embodiments of the present invention and its advantages, reference is now made to the following description, taken in conjunction with the accompanying drawings, in which:

FIGS. 1a-1c depict example components according to an embodiment of the disclosed subject matter.

FIG. 3 depicts an example of techniques employed in performing mutual authentication between two entities in accordance with the present invention.

DETAILED DESCRIPTION

Figure 1A:
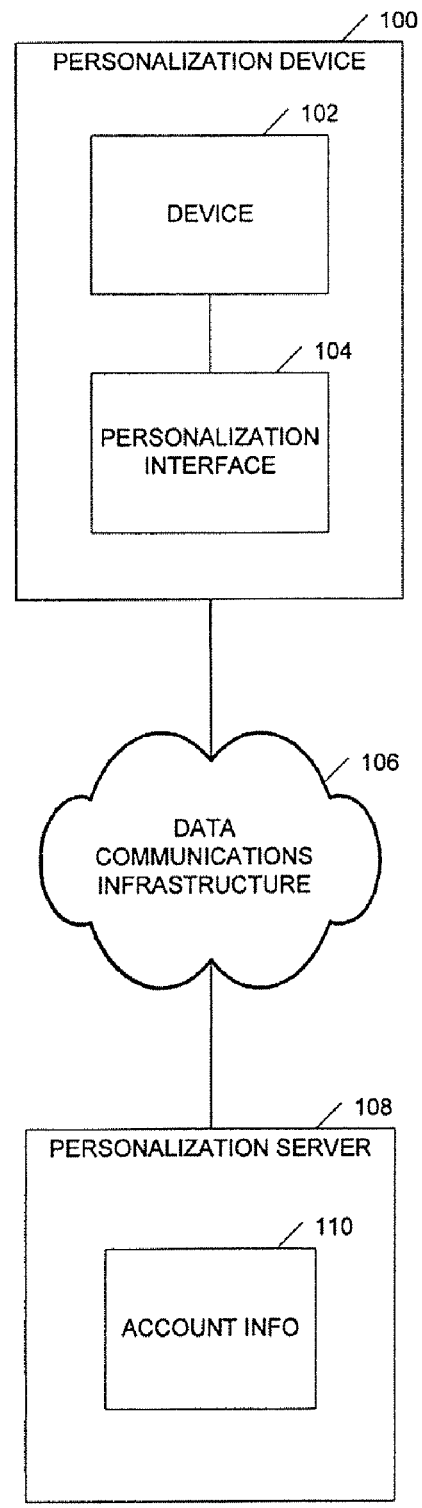

The use of one-time codes or one-time passwords to perform unilateral authentication are known in the art. These techniques typically employ a hardware and/or software device capable of generating an unpredictable code that can be sent in the clear, or via a channel protected by independent security techniques, to a second entity for authentication, such as a web-server or an authentication computer. Examples of such techniques for payment authentication are described in U.S. Patent Application Publication Number 2005-0119978, entitled "Authentication arrangement and method for use with financial transactions," and International Publication Number WO05001618, entitled "Customer authentication in e-commerce transactions" which are incorporated by reference in there entireties herein.

In one embodiment of the present invention, shown in FIG. 3, a first entity (the originator) 301 seeking to authenticate with a second entity (the receiver) 303 generates a first one-time code (i.e. OTP1) 305 and sends the code 307 to the receiver 303. The one time code 305 (referred to herein as an authentication code) may be generated using the techniques in the above-mentioned patent publications, techniques described in more detail herein, or may be simply a code extracted from a shared secret list of codes used for authentication or other purposes. To accomplish authentication, it is advantageous that receiver be able to confirm 309 that the one time code received was generated by the first entity. This is achieved using cryptographic techniques using a shared key or a public/private key pair, or by using a shared list of secret codes, as previously described. The authentication code should advantageously change after each use, such as by including a time stamp or incrementing or decrementing counter in the inputs to the cryptographic function, or by selecting a different code from the list of shared secret codes with each iteration of the techniques of the invention.

Once the receiver has confirmed that it has received an authentication code from the first entity, and has performed the comparison or calculations necessary to ensure the code is authentic 309, the receiver can then determine or calculate two subsequent one time authentication codes (i.e. OTP2 and OTP3) 311 using the techniques previously described. The receiver then uses OTP3 either as an encryption key, or as an input to an encryption key generation algorithm known to both entities, 313 and uses the resultant communication key to encrypt OTP2 315. The encrypted version of OTP2 is sent 317 to the originator, which calculates on its own OTP2, OTP3 319 (and the encryption key, if the system design uses OTP3 as an input to a key generation algorithm rather than using OTP3 as the encryption key) 321, decrypts the received message and verifies that it contains the OTP2 323. If the originator verifies that OTP2 was properly calculated by the recipient, mutual authentication is achieved. Further communications between the first entity and the second entity may then be secured using the encryption key based on OTP3 (or using OTP3 as the encryption key).

Notably the encryption key is thereby never exchanged between the first entity (originator) and the second entity (recipient), avoiding a potential insecurity associated with transmitting an encryption key and exposing the key to interception. If heightened security is desired, the techniques of this embodiment may involve occasionally (i.e. after every message, or every n messages, where n is a predetermined integer) calculating a new OTP by both entities, and using that new OTP as the encryption key (or the input to an encryption key generation algorithm).

In another exemplary embodiment, based on the foregoing description regarding FIG. 3, the encryption key (OTP3) is a cryptogram generated by an EMV-compliant application residing on a payment device, and may be, for example, a cryptogram generated in response to a "Generate AC" command supplied to the EMV application resulting in an application authentication cryptogram (AAC), an authorization request cryptogram (ARQC), or a transaction certificate (TC), such as is described in the EMV Integrated Circuit Card Specifications for Payment Systems, Common Payment Application Specification version 1.0, dated December 2005, which is incorporated by reference herein in its entirety.

An embodiment of the invention as applied to personalization of a transaction device is now described in further detail. In accordance with FIG. 1a, a personalization device 100, such as a transaction terminal, may be in communication with a transaction device 102 that is to be personalized via a personalization interface 104. The personalization device 100 may be in communication with a personalization server 108 over a data communications infrastructure 106. The personalization device 100 may be any transaction terminal capable of communicating with the transaction device, for example, the terminal may be a point-of-sale terminal, a portable digital device, a cell phone, a smart phone, or similar devices. The interface 104 may include any interface capable of exchanging data between the terminal and the transaction device, and may include a contactless interface, as described in ISO Standard 14443 or similar standards as well known in the art, or may be a traditional smart card or integrated circuit card interface in physical and electrical contact with the transaction device. The device 102 and personalization device 100 may be in constant communication throughout the personalization process or may be in intermittent communication. For example, the user may be asked to wave the device 102 in front of the personalization device 100 at various points in the personalization process so that data may be communicated therebetween. Communications infrastructure may be any electromagnetic communications channel, including radio or cellular network over-the-air communications, IR, the Internet, a private network, including a VPN operating over a public network, point-to-point communications systems, dedicated lines, or similar technologies. In one embodiment, the data communications infrastructure 106 may include the MasterCard Banknet® network.

To personalize the device transaction 102, the personalization device 100 may establish secure communications with personalization server 108 over data communications infrastructure 106. The messages exchanged through the secure communications may include personalization data. The personalization data may include one or more payment or transaction account numbers, encryption keys, cardholder identification information, and other account data 110 well known to persons of ordinary skill in the art. The personalization data is loaded into transaction device 102 via the personalization interface 104, enabling the transaction device to be used for identification and other purposes (e.g., payment activities). Personalization data may also include data beyond identifying or functional data. For example, a payment card may include a customer's preferences for types of products and services. A merchant processing a transaction with the payment card may scan this data and print advertisements or coupons that are tailored to the customer's preferences, or use the information for other marketing or research purposes consistent with the merchant's loyalty program terms and conditions. In another example, the data association may be performed apart from the device itself. For example, the personalization data may simply entail a reference pointer to a data storage entity. The account or device-holder identification data may be stored in a data storage device separate from the transaction device 102, and accessed via the reference pointer stored on the transaction device 102 during a subsequent transaction.

The personalization server 108 may associate identifying information with account info 110 so that the entity to which the device is personalized may gain access to the account info when using the personalized device 102.

The device 102 may include any appropriate device capable of having personalization data associated with it. For example, the device may include a device (such as a card, wrist watch, key, etc.) with magnetic stripe or integrated circuit or other suitable data memory for storing the personalization data.

Implementation of the personalization device 100 and personalization server 108 may be one or more computing platforms well known to those ordinarily skilled in the art. The designation of personalization server 108 as a server is purely for convenience of describing the subject matter as the personalization server 108 may be capable of acting as a client itself.

Figure 1B:
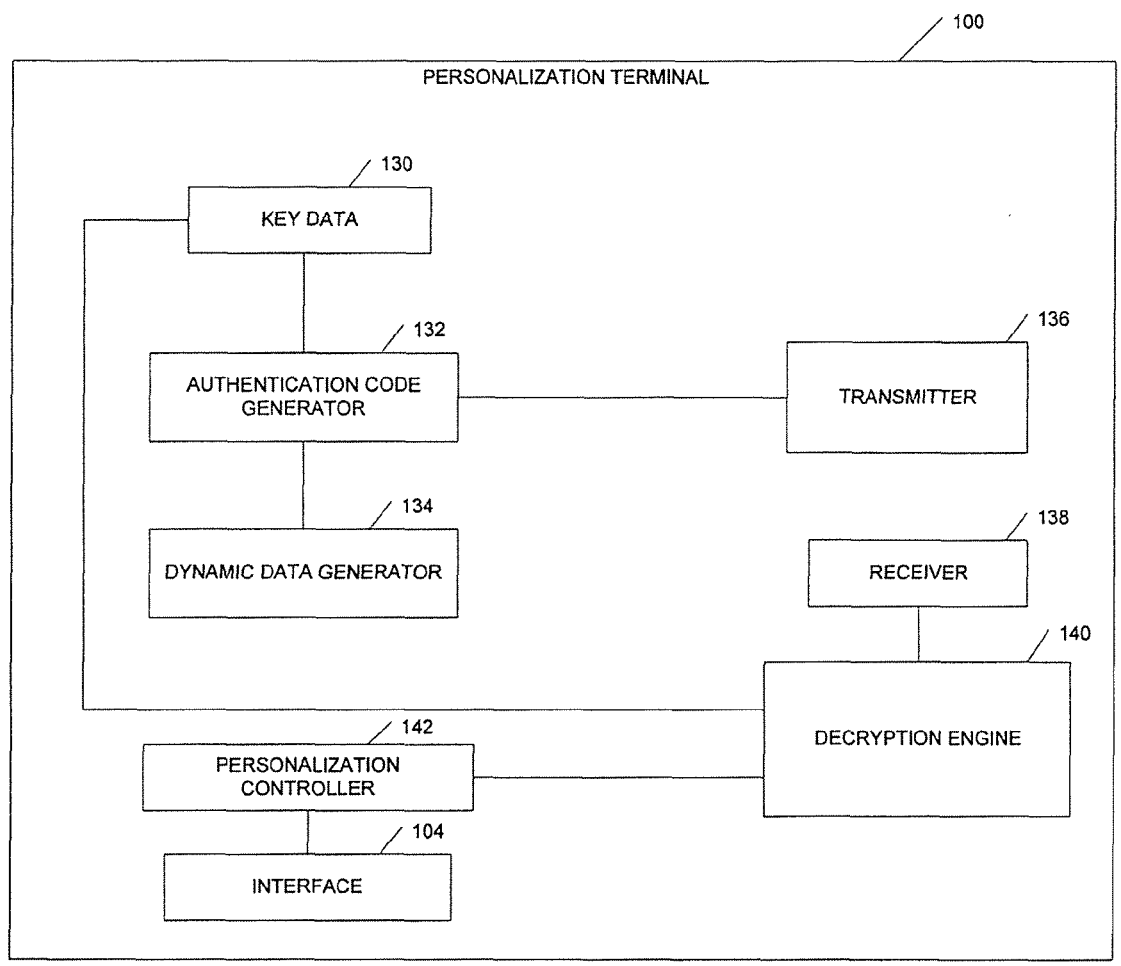

One exemplary personalization terminal 100 for use with the techniques of the present invention is shown in FIG. 1b. The personalization terminal may consist of a key data digital storage device 130 for storing digital data. The storage device may be any structure capable of storing digital data including RAM, ROM, EEPROM, flash memory, magnetic media, or other similar technologies. In one embodiment, storage 130 is secured storage, keeping the contents secure from external tampering, such as by erasing the contents if the memory is tampered with. The key data may consist of any digital data maintained in secret by one or more entities to accomplish secured communications or message authentication in accordance with well known cryptographic techniques.

Personalization terminal 100 also includes dynamic data generator 134. This device is capable of generating changing (i.e. not static) data. For instance, the dynamic data generator may produce pseudo-random data via a known algorithm based on a predetermined initial data, incrementing or decrementing counter data, or clock data based on a predictable timing signal. Other types of dynamic data are possible and considered to be within the scope of the present invention as long as the data is not static and changes relatively frequently in a manner that is predictable by a verification computer in communication with the personalization terminal 100.

Authentication code generator 132 (also referred to as a generation engine) receives data from the dynamic data generator 134 and key data storage 130 in order to generate an authentication code. The authentication code generator may use additional data in order to generate the authentication code without departing from the scope or spirit of the invention. In one exemplary embodiment, authentication code generator takes as an input a first dynamic data from the dynamic data generator 134 and performs a cryptographic operation on that data using key data from the key data storage 130. The cryptographic operation may include calculating a message authentication code as described in ISO standard 9797 and/or 9798-4. The cryptographic operation performed may be any typical operation well-known in the art, including symmetric cryptographic standards such as DES, 3DES, AES, or public-key or other asymmetric standards such as PKCS.

The resulting authentication code may be shortened by selecting predetermined bits from the digital result, or may be transmitted in its entirety together with all or a portion of the dynamic data used to generate the authentication code via transmitter 136, as described in further detail herein. Transmitter 136 and receiver 138 may be any of various transmitters or receivers well known in the art for transmitting or receiving data in digital or analog form, such as via a wired computer network, a wireless computer network, a radio, or cell data network. Transmitter 136 and receiver 138 may be combined into a single transceiver using well-known techniques. Transmitter 136 and receiver 138 may include any components necessary to modulate or demodulate any signals to be transmitted or received as necessary in view of the communications medium over which they operate.

Terminal 100 may also include a decryption engine 140, for decrypting encrypted data received via receiver 138. The decryption engine 140 may use key data obtained from key data storage area 130 to perform decryption, or may use key data stored in an alternative permanent or temporary storage area, not shown. Decryption engine 140 makes use of well known decryption techniques as appropriate in view of the type of encryption employed by the entity with which the personalization terminal 100 is in communication, so as to recover the unencrypted data.

Personalization terminal 100 may further include a personalization controller 142 coupled to the interface 104 for controlling the personalization of the transaction device coupled to the terminal via interface 104, as previously described with respect to FIG. 1a. Exemplary techniques for personalizing a payment card, which could be used in connection with the present invention, are described in the PayPass—Mag Stripe Technical Specifications, published by MasterCard Worldwide of Purchase, N.Y., which is incorporated by reference herein in its entirety. Other personalization techniques will be apparent to persons of ordinary skill in the art and are intended to be within the scope of the present invention.

FIG. 1c illustrates one exemplary verification computer 107 for use in the present invention. Verification computer 107 may be coupled to a separate personalization data storage computer (not shown), or may itself generate or store personalization data, to transmit to the personalization terminal 100 as shown in FIGS. 1a and 1b. The combination of the personalization data storage device and the verification computer 107 is referred to as a personalization server 108 herein.

Verification computer 107 includes a key data storage device, similar to device 130 shown in FIG. 1b. The key data storage area may include multiple keys, each associated with a particular transaction device 102 (as shown in FIG. 1a), or may use a single key associated with multiple devices.

Verification computer 107 includes a receiver 162 and transmitter 164, similar in structure and function to transmitter 136 and receiver 138 shown in FIG. 1b.

According to some example embodiments, the keys stored in the data storage devices of the personalization terminal 100 and the personalization server 108 may be exchanged prior to personalization. This prepersonalization procedure may be accomplished by using any appropriate technique in which the terminal and server wind up with the same keys. For example, the personal terminal and server may be loaded with the same keys at the manufacturer or may be loaded in a post-manufacturing procedure. Alternatively, the key may be loaded on the personalization device 102 itself. When the personalization device is interfaced with the personalization interface 104, the key may be retrieved from the personalization device 102 and stored in the key data store at the personalization terminal 100.

Dynamic data transformation engine 166 is designed to receive dynamic data from receiver 162 and transform that data using a predetermined mathematical algorithm. For example, where the transaction device employs an incrementing counter to generate dynamic data, the dynamic data transformation engine 166 acts on the received dynamic data by incrementing the received data by one, or the appropriate incrementing interval as predetermined by the system designer. Alternatively, the transformation engine 166 may pre-calculate the next dynamic data after each message or transaction. This transformed data is then further used as explained herein. For example, an authentication code generated at the personalization server 108 may be generated in part from the dynamic data. In some embodiments, the dynamic data is derived by the personalization server itself, instead of being received through receiver 162. In this case, the dynamic data may be generated in a similar fashion as compared with the personalization device 100 or in a predictable manner thereof. For example, the dynamic data may be generated by a similarly seeded, monotonically increasing counter at both personalization device 100 and personalization server 108 or by synchronized time clocks.

Authentication code generator 168 functions in a similar manner to device 132 in FIG. 1b. Authentication code generator 168 receives the dynamic data and uses a preselected algorithm to generate the authentication code, such as an appropriate cryptographic function.

Comparator 170 is coupled to receive an authentication code received from the receiver 162 and the authentication code generator 168 to verify that the received authentication code is authentic, by comparing the two authentication codes. The comparator may be any well-known structure for comparing two data values for equality or inequality. It should be noted that in order for authentication codes to be "equal," the authentication codes need not strictly be equal. It is sufficient to verify that the calculated authentication code has the expected relationship with the received authentication code. For example, the calculated authentication code may be one number greater than the received authentication code, or may be equal to the next expected authentication code, and are, for purposes of the described subject matter, "equal."

Encryption engine 172 is similar to decryption engine 140 of FIG. 1b, but is used to encrypt data before transmitting it transmitter 164. The encryption engine 172 may use key data obtained from key data storage area 160 to perform decryption, or may use key data stored in an alternative permanent or temporary storage area, not shown, including key data derived in whole or in part from the authentication code generator 168. Encryption engine 172 makes use of well known encryption techniques as appropriate in view of the decryption capabilities of personalization terminal 100. Encryption engine 172 may operate on any unencrypted data, however in a preferred embodiment, encryption engine 172 operates on personalization data (not shown) associated with the transaction device 102 of FIG. 1a, as previously described.

It should be noted that the above-mentioned dynamic data generator, authentication code generator, authentication code generation engine, encryption engine, decryption engine, personalization controller may be implemented as firmware in an integrated circuit device, or as software executed by a general purpose processor, a reduced instruction set processor, or a special purpose processor or circuitry.

The personalization terminal 100 and personalization server 108 may secure communications respectively using a shared data authentication code. For example, the terminal 100 may generate a first authentication code based on a secret key and a transaction counter and transmit the authentication code and all or a portion of the transaction counter. The personalization server may then recompute the authentication code using the received transaction counter data and the shared key data stored on the personalization server. If the recomputed authentication code matches the received authentication code, the personalization server and the transaction device may then each separately increment the transaction counter and calculate a new authentication code using the new transaction counter, yielding a new shared secret code. This shared secret code (which cannot be calculated by a third party who does not know the shared secret key) can now be used as an encryption key, or may be modified using a shared algorithm to generate a new encryption key to communicate subsequent data, including the personalization data. It should be noted that the subsequent authentication code is not transmitted between the terminal 100 and personalization server 108, thereby avoiding man-in-the-middle attacks.

It should be noted that more sophisticated transformation and prediction algorithms may be used to generate the next authentication code value given the previous value such that an unscrupulous individual who gains access to one or more codes cannot predict future codes. The personalization device and personalization server may each be programmed with the ability to predict the next value of the opposite entity's authentication code once the entity knows a value of the entity's authentication code.

Figure 2:
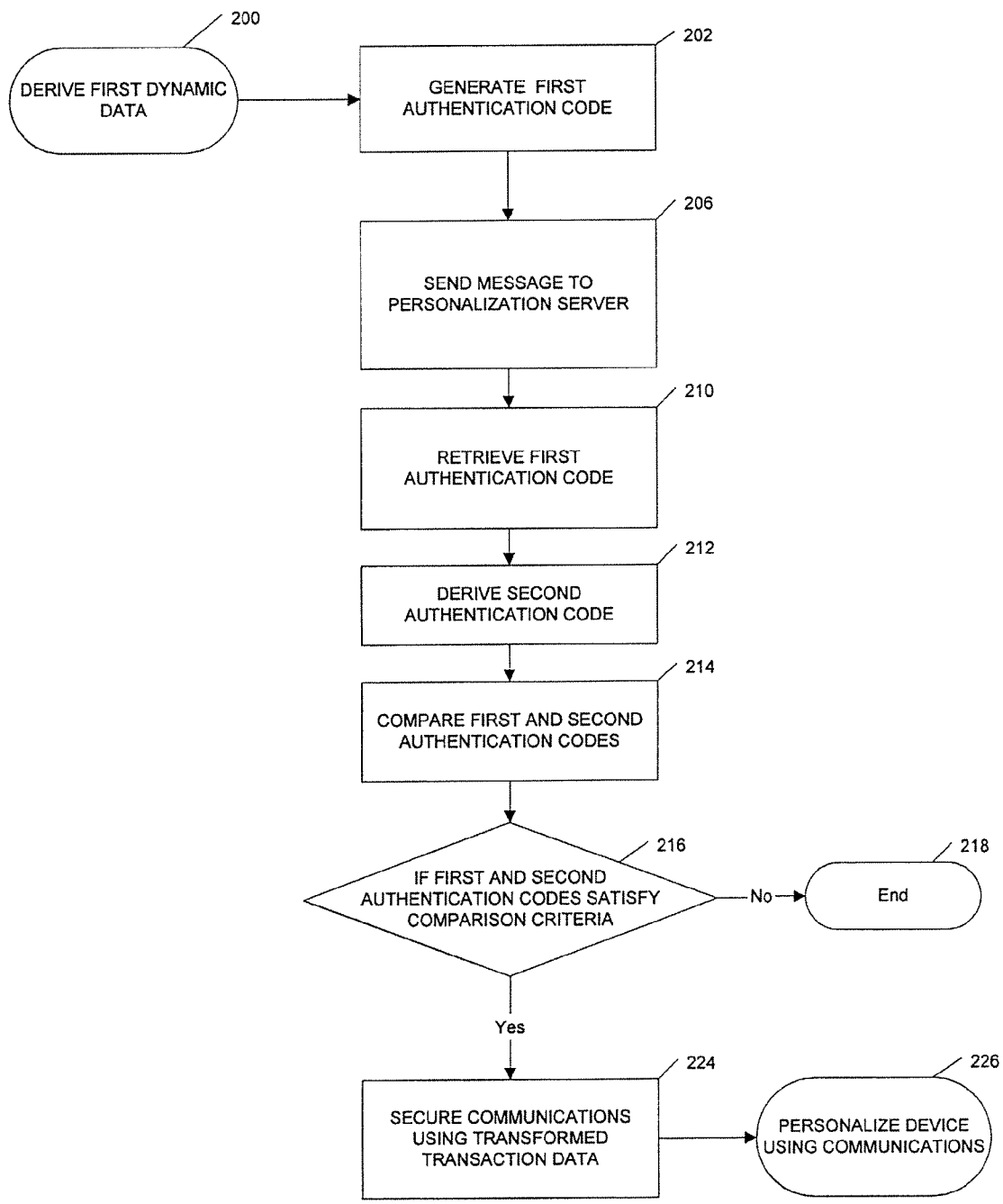
FIG. 2 depicts an example procedure according to an embodiment of the disclosed subject matter.

FIG. 2 depicts an example procedure according to an embodiment of the disclosed subject matter. A personalization terminal may obtain a first dynamic data 200. As described, the first dynamic data may be obtained from memory, derived from a value in memory, or obtained from another dynamic data source that is shared with or predicable by a verification computer.

The personalization terminal may generate a message that may include the first authentication code (block 202). The message may be calculated using a cryptographic function using a secret key over data that includes all or a portion of the dynamic data. In one embodiment, the key may be shared between the personalization terminal and a verification computer. In another embodiment, the personalization terminal may retrieve the key from an outside entity, such as a device to be personalized.

The personalization terminal may send the message to the verification computer (block 206) over a data communications infrastructure.

The verification computer may retrieve the first authentication code from the message (block 210) and derive a second authentication code (block 212). For example, the verification computer may determine the dynamic data used to generate the first authentication code, then determine the next dynamic data, such as by incrementing or decrementing the received dynamic data. This modified dynamic data would then be used to calculate a second authentication code. Alternatively, the personalization server may not modify the dynamic data but may use the dynamic data as received to calculate the second authentication code. In another embodiment, the dynamic data may not be sent in the message, and the personalization server may derive the dynamic data on its own. For example, the dynamic data may be a monotonically increasing counter synchronized between the personalization terminal and personalization server. The verification computer may compare the first and second authentication codes (block 214). If the authentication codes meet comparison criteria (e.g., if they match) (block 216), processing continues to personalization. If the comparison criteria are not met, then an error message may be returned (block 218). It should be noted that the comparison criteria need not consider both the first and second authentication codes, and may instead determine the authenticity of the first authentication code using another technique. Alternatively, no comparison need be made, and the system may simply assume that the first authentication code is authentic and proceed to personalization, although this is not recommended in most embodiments of the present invention.

The second authentication code may be transformed. The transformed second authentication code may be used to secure communications of the personalization information during the personalization procedure (as described below). Transformation of the second authentication code by the personalization server may derive a second authentication code that is in accordance with the authentication code expected to be used by the personalization terminal. Likewise, if during the techniques of the described subject matter, the personalization terminal transforms an authentication code, such as to secure communications destined for the personalization server, the transformation may generate an authentication code in accordance with what is expected by the personalization server. If the transformed authentication codes are generated to be what is expected by the receiving parties, then the receiving parties may decrypt the received messages successfully using the authentication codes as decryption keys.

The personalization terminal and verification computer may exchange communications secured using the transformed second authentication code, with both the personalization terminal and verification computer each calculating the transformed second authentication code separately. Accordingly, the personalization server may encrypt and transmit personalization information 224 to the personalization terminal, which can then personalize the device 226 using that information.

The techniques of the present invention are well-suited to point of sale environments, many of which have sockets for ID-0 chip cards (i.e. EPM modules or GSM SIM cards). The personalization terminal of the present invention could be implemented by a ID-0 card in a modified POS terminal running a CAP chip application in accordance with the 3-D Secure Chip Authentication Program specification from Mastercard Worldwide of Purchase, N.Y., the contents of which is incorporated by reference herein in its entirety. Alternatively, a standard hardware security module could be used.

In one exemplary embodiment of the present invention, the techniques are employed to personalize a MasterCard PayPass payment device where no pre-personalization was previously performed. In this case, then the data required to be sent could be quite significant since the data needs to include the PayPass application itself, PayPass pre-personalization data and PayPass personalization data.

In another exemplary embodiment of the present invention, the techniques are employed to personalize a MasterCard PayPass payment device where the device has been already pre-personalized as per the PayPass specifications, then the data required will be small (at most a few hundred bytes). The PayPass infrastructure also defines a mechanism for protecting the data end to end by using the personalization key of the device. However, the plaintext personalization data could be subject to eavesdropping so it is recommended that further protection should be applied in accordance with the present invention.

The foregoing merely illustrates the principles of the present invention. Various modifications and alterations to the described embodiments will be apparent to those skilled in the art in view of the teachings herein. It will thus be appreciated that those skilled in the art will be able to devise numerous techniques which, although not explicitly described herein, embody the principles of the invention and are thus within the spirit and scope of the invention.

What is claimed is:

1. A method for securely personalizing a transaction device comprising:
   obtaining first dynamic data;
   retrieving at least a portion of key data from a data storage;
   calculating a first authentication code based on said first dynamic data and said at least a portion of key data;
   transmitting at least a portion of said first dynamic data and said first authentication code to a verification computer;
   obtaining second dynamic data based on said first dynamic data;
   calculating a second authentication code based on said second dynamic data and said at least a portion of key data;
   receiving personalization data encrypted using a key based at least in part on said second authentication code;
   decrypting said personalization data; and
   personalizing said device based at least in part on said personalization data.

2. The method of claim 1, wherein said first dynamic data is a counter.

3. The method of claim 2, wherein said obtaining second dynamic data comprises incrementing said first dynamic data.

4. The method of claim 1, wherein said transaction device is a contactless payment device.

5. The method of claim 1, wherein said calculating a first authentication code comprises:
   generating a digital encryption key based on said at least a portion of key data;
   performing a digital cryptographic operation on input data consisting at least in part of said first dynamic data, using said encryption key; and
   extracting predetermined bits of the result of said cryptographic operation and designating those extracted bits as said first authentication code.

6. The method of claim 1, wherein said personalizing includes programming said transaction device with a secret key.

7. The method of claim 1, wherein said personalizing includes programming said transaction device with a payment account number.

8. The method of claim 1, wherein said calculating a second authentication code comprises causing an EMV-compliant smart card to generate an application cryptogram and using at least a portion of said cryptogram as said second authentication code.

9. The method of claim 8, wherein said causing an EMV-compliant smart card to generate an application cryptogram includes generating at least one of an application authentication cryptogram, an application authorization referral, and authorization request cryptogram, and a transaction certificate.

10. A method for securely personalizing a transaction device comprising:
    receiving, from a transaction terminal, an authentication message comprising at least a portion of a first dynamic data and a first authentication code associated with said transaction device;
    calculating a second dynamic data based on said first dynamic data;
    retrieving at least a portion of key data from a data storage;
    calculating a second authentication code based on said second dynamic data and said at least a portion of key data;
    encrypting personalization data associated with said transaction device using an encryption key based at least in part on said second authentication code; and
    transmitting said personalization data in encrypted form to said transaction terminal for personalization of said transaction device.

11. The method of claim 10, wherein said calculating a second authentication code comprises:
    generating a digital encryption key based on said at least a portion of key data;
    performing a digital cryptographic operation on input data consisting at least in part of said second dynamic data, using said encryption key; and
    extracting predetermined bits of the result of said cryptographic operation and designating those extracted bits as said second authentication code.

12. The method of claim 10 wherein said personalization data includes a secret key.

13. The method of claim 10 wherein said personalization data includes a payment account number.

14. An apparatus for personalizing a transaction device, comprising:
    a dynamic data generator arranged to generate a first dynamic data and a second dynamic data, said second dynamic data mathematically related to said first dynamic data;
    a key data digital storage device;
    an authentication code generation engine electrically coupled to said dynamic data generator and said key data digital storage device, said authentication code generation engine arranged to calculate a first authentication code based on a first dynamic data obtained from said dynamic data generator and at least a portion of key data obtained from said key data digital storage device, said authentication code generation engine further arranged to calculate a second authentication code based at least in part on said second dynamic data;
    a transmitter coupled to said authentication code processor arranged to transmit at least a portion of said first dynamic data and said first authentication code;
    a receiver arranged to receive encrypted personalization data;
    a decryption engine coupled to said receiver arranged to decrypt said personalization data using a second authentication data;
    a personalization controller for personalizing said transaction device based at least in part on said decrypted personalization data.

15. The apparatus of claim 14, wherein said transaction device is a contactless integrated circuit payment device.

16. The apparatus of claim 14, wherein at least one of said authentication code generation engine, said decryption engine, and said personalization controller is implemented as a firmware module embedded within said transaction device.

17. The apparatus of claim 14, wherein at least one of said authentication code generation engine, said decryption engine, and said personalization controller is implemented as a software module executed by a processor in said transaction device.

18. The apparatus of claim 14, wherein said personalization data includes a secret key.

19. The apparatus of claim 14, wherein said personalization data includes a payment account number.

20. The apparatus of claim 14, wherein said authentication code generation engine is executing on an EMV-compliant smart card and said second authentication code is at least one of an application authentication cryptogram, an application authorization referral, and authorization request cryptogram, and a transaction certificate 21. An apparatus for generating transaction device personalization data, comprising:
 a key data digital storage device;
 a receiver arranged to receive from a personalization terminal, an authentication message comprising at least a portion of a first dynamic data and a first authentication code associated with said transaction device;
 a dynamic data transformation engine electrically coupled to said receiver, arranged to transform said first dynamic data into second dynamic data;
 an authentication code generation engine electrically coupled to said key data digital storage device, said authentication code processor arranged to calculate a second authentication code based on a first dynamic data obtained from said dynamic data generator and at least a portion of key data obtained from said key data digital storage device;
 a comparator electrically coupled to said authentication code generation engine arranged to compare said first authentication code and said second authentication code, wherein said authentication code generation engine is further arranged to calculate a third authentication code based at least in part on said second dynamic data when said comparator determines that said first authentication code equals said second authentication code;
 a personalization data storage device;
 an encryption engine electrically coupled to said authentication code generation engine and said personalization data storage device, arranged to encrypt said personalization data using an encryption key based at least in part on said third authentication code; and
 a transmitter electrically coupled to said encryption engine arranged to transmit said personalization data in encrypted form to said transaction terminal for personalization of said transaction device.

22. The apparatus of claim 21, wherein said transaction device is a contactless integrated circuit payment device.

23. The apparatus of claim 21, wherein said apparatus for generating transaction device personalization data includes a processor, and wherein said at least one of said a dynamic data transformation engine, said authentication code generation engine, said comparator, and said encryption engine is implemented as a software module executed by said processor.

24. The apparatus of claim 21, wherein said personalization data includes a secret key.

25. The apparatus of claim 21, wherein said personalization data includes a payment account number.

\* \* \* \* \*